United States Patent
Clark et al.

(10) Patent No.: US 6,783,783 B2
(45) Date of Patent: Aug. 31, 2004

(54) TRIPLE COATED CONFECTIONERY TABLET PRODUCT

(75) Inventors: James C. Clark, St. Louis, MO (US); Lonnette Alexander, Chicago, IL (US); Barbara Z. Stawski, Forest Park, IL (US); Vasek J. Kures, Willow Springs, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 158 days.

(21) Appl. No.: 10/418,020

(22) Filed: Apr. 17, 2003

(65) Prior Publication Data

US 2003/0198713 A1 Oct. 23, 2003

Related U.S. Application Data

(60) Provisional application No. 60/374,023, filed on Apr. 19, 2002.

(51) Int. Cl.[7] .................................................. A23G 1/00
(52) U.S. Cl. ....................... 426/103; 426/303; 426/306; 426/658; 426/660
(58) Field of Search ................................ 426/103, 303, 426/306, 660, 658

(56) References Cited

U.S. PATENT DOCUMENTS

| 4,289,790 A | * | 9/1981 | Bruelle .......................... 426/93 |
|---|---|---|---|
| 4,623,543 A | | 11/1986 | Motegi et al. |
| 4,640,218 A | | 2/1987 | Motoyama et al. |
| 4,684,523 A | | 8/1987 | Ferrero ......................... 424/441 |
| 4,725,441 A | | 2/1988 | Porter et al. |
| 4,802,924 A | | 2/1989 | Woznicki et al. |
| 4,828,841 A | | 5/1989 | Porter et al. |
| 4,828,845 A | | 5/1989 | Zamudio-Tena et al. |
| 4,971,806 A | | 11/1990 | Cherukuri et al. |
| 4,981,698 A | | 1/1991 | Cherukuri et al. |
| 5,098,715 A | | 3/1992 | McCabe et al. |
| 5,437,879 A | | 8/1995 | Kabse et al. |

(List continued on next page.)

FOREIGN PATENT DOCUMENTS

| EP | 0 212 824 | 3/1987 |
|---|---|---|
| EP | 0 298 768 A2 | 1/1989 |
| EP | 0 399 479 A1 | 11/1989 |
| EP | 0 433 004 A2 | 6/1991 |
| EP | 0 437 098 A2 | 7/1991 |
| EP | 0 273 000 B1 | 9/1991 |
| EP | 0 458 750 A1 | 11/1991 |
| EP | 0 890 358 A1 | 1/1999 |
| WO | WO 95/12990 | 5/1995 |
| WO | WO 97/24036 | 7/1997 |
| WO | WO 01/49270 A2 | 7/2001 |
| WO | WO 01/80660 A1 | 11/2001 |

OTHER PUBLICATIONS

Minifie, Bernard W., Ph.D., "Chocolate, Cocoa, and Confectionary", *Science and Technology* Third Edition, Published by Van Nostrand Reinhold, New York, NY., copyright 1989, pp. 165–182.

*Primary Examiner*—N. Bhat
(74) *Attorney, Agent, or Firm*—Steven P. Shurtz; Brinks Hofer Gilson & Lione

(57) ABSTRACT

A coated confectionary tablet product has a compressed tablet center; a first coating layer surrounding the tablet and comprising a fat; a second coating layer surrounding the first coating layer and comprising a hard shell made from one or more sugars and polyols; and a third coating layer surrounding the second coating layer and comprising a film containing film forming agents.

35 Claims, 1 Drawing Sheet

U.S. PATENT DOCUMENTS

| | | | |
|---|---|---|---|
| 5,470,581 A | | 11/1995 | Grillo et al. |
| 5,571,547 A | * | 11/1996 | Serpelloni et al. .......... 426/103 |
| 5,578,336 A | * | 11/1996 | Monte .......................... 426/72 |
| 5,827,852 A | | 10/1998 | Russell et al. |
| 5,900,261 A | * | 5/1999 | Ribadeau-Dumas et al. ... 426/5 |
| 6,024,995 A | * | 2/2000 | Rosso ........................... 426/93 |
| 6,183,808 B1 | * | 2/2001 | Grillo et al. ............... 427/2.14 |
| 6,207,207 B1 | | 3/2001 | Belzowski et al. |
| 6,221,407 B1 | | 4/2001 | Gallart et al. |
| 6,231,900 B1 | | 5/2001 | Hanke |
| 6,245,384 B1 | | 6/2001 | Lott |
| 6,251,448 B1 | | 6/2001 | DeStephen et al. |
| 6,290,985 B2 | | 9/2001 | Ream et al. |
| 6,372,271 B1 | * | 4/2002 | Fritzsching et al. ........ 426/103 |

* cited by examiner

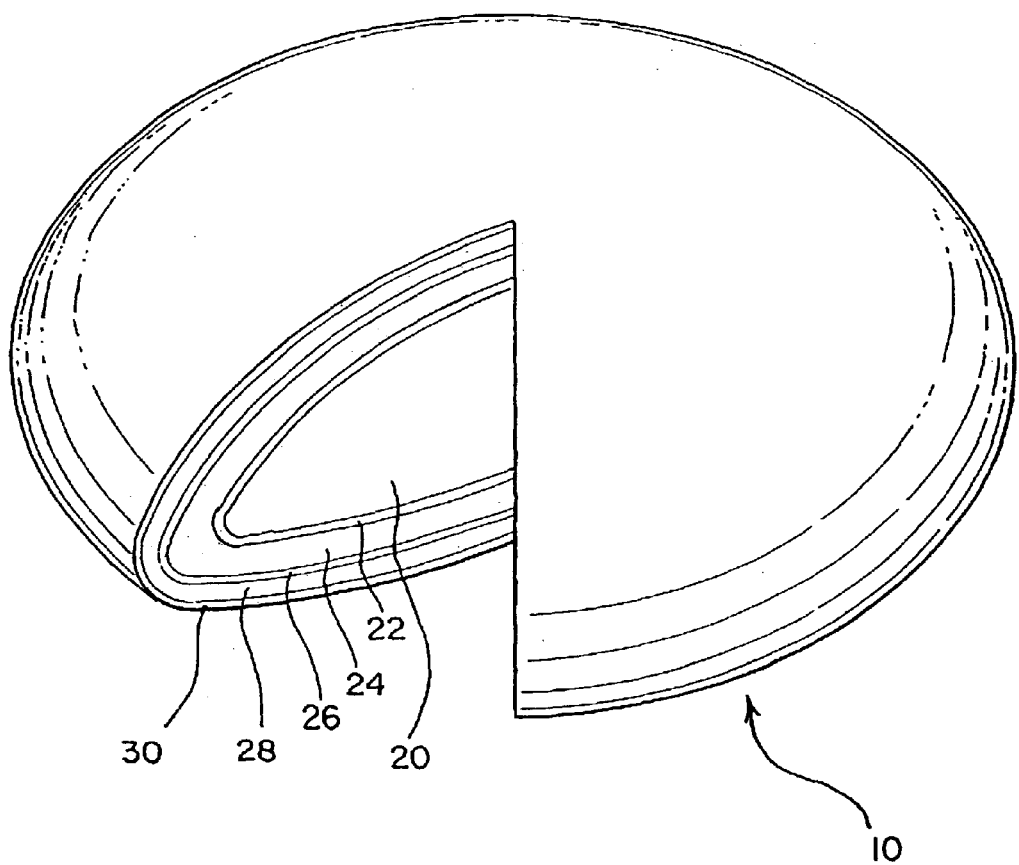

TRIPLE COATED CONFECTIONERY TABLET PRODUCT

REFERENCE TO EARLIER FILED APPLICATION

The present application claims the benefit of the filing date under 35 U.S.C. §119(e) of Provisional U.S. Patent Application Serial No. 60/374,023, filed Apr. 19, 2002, which is hereby incorporated by reference in its entirety.

BACKGROUND OF THE INVENTION

The present invention relates to confectionary tablets, and particularly to confectionary tablets that are coated with multiple coating layers each having different properties.

Numerous coated confectionaries are available. Many confectionaries, such as M&M's or chewing gum balls, have a hard shell sugar coating. Some products, such as M&M's CRISPIES, have a hard center, with a chocolate covering followed by a hard shell coating, as disclosed in U.S. Pat. No. 6,207,207. Thus multiple layers of coatings are known. Other confectionaries, coated and non-coated, have breath-freshening properties. Some coated confectionaries have flavor in the coating layers. However, there is still room for improvement. For example, most products produce a high initial flavor impact that does not last. Other products may produce fairly uniform flavor impact over the duration of the time the product is in the mouth. If the flavor impact is high, it might initially be over powering. If it is low, it may not be satisfying if the product stays in the mouth for very long. Thus, it would be desirable if a product had an initial mild flavor impact that increased to a more intense flavor as the product remained in the mouth. Also, improvements in the center tablet composition and the coating layers themselves would be desirable.

SUMMARY OF THE INVENTION

A triple coated tablet confectionary product has been invented. With the triple layers of coating, the product has a unique overall coating. Also, in preferred embodiments the different layers of coating and the tablet center can have different levels of flavors so as to produce a product that has an increasing flavor level as it is sucked or chewed.

In a first aspect the invention is a coated confectionary tableted product comprising: a compressed tablet center; a first coating layer surrounding the tablet center and comprising a fat; a second coating layer surrounding the first coating layer and comprising a hard shell made from one or more sugars and polyols; and a third coating layer surrounding the second coating layer and comprising a film containing film forming agents.

In a second aspect, the invention is a multilayer coated confectionary product comprising: a center; a first layer covering the center, the first layer comprising a compound coating; a second layer covering the first layer, the second layer comprising a hard shell coating; and a third layer covering the second layer, the third layer comprising a film layer.

In a third aspect, the invention is a multilayer confectionary product that builds in flavor intensity as the product dissolves in the mouth comprising: a film layer that provides a mild flavor impact; a hard shell coating under the film layer and having a higher flavor impact than the film layer; a compound coating layer under the hard shell coating and having a higher flavor impact than the hard shell coating; and a tablet center inside the compound coating layer.

In a fourth aspect, the invention is a method of producing a multilayer confectionary product comprising the steps of: providing a center forming a compound coating layer over the center by applying multiple coats of a molten compound coating over the center, with cooling between coats to solidify the compound coating; applying a hard shell coating over the compound coating layer by panning the compound coated center by applying multiple coats of a panning syrup comprising a sugar, a polyol or mixtures thereof; and applying a film coating over the hard shell coating layer by applying multiple coats of a syrup containing one or more film forming agents.

In the preferred embodiment of the invention, a tableted mint is coated with a compound coating of sugar/fat/milk protein to give a soft coating. The soft-coated product is then sugar coated to give a hard shell to make a hard panned coating on a tablet. The product is then finished with a film coating. In each of the coating levels flavor, sweeteners, and cooling agents are added in such an amount to give the impression of increasing flavor intensity as the tablet is chewed or sucked. This type of product is unique in its composition and delivery of intense flavors for breath freshening effects.

BRIEF DESCRIPTION OF THE DRAWING

FIG. 1 is a partially broken away perspective view a preferred coated tablet of the present invention.

DETAILED DESCRIPTION OF THE DRAWING AND PREFERRED EMBODIMENTS OF THE INVENTION

As shown in FIG. 1, the preferred coated tablet 10 of the present invention comprises a center tablet 20, a first binder layer 22, a compound coating layer 24, a second binder layer 26, a hard shell layer 28, and a film coating layer 30.

The center tablet 20 is a preferably compressed tablet made by conventional means. A compressed tablet is a mixture of base materials, binders, flavors, and lubricants. The base material may be a sugar or a polyol. Among the sugars that may be used are sucrose, dextrose, lactose, maltose, and other common sugars. In addition, base materials may include non-sugar bulking agents. Among these are polyols such as sorbitol, maltitol, mannitol, xylitol, hydrogenated isomaltalose, lactitol, erythritol and combinations thereof. High-intensity sweeteners such as acesulfame K, aspartame, alitame, sucralose, glycyrrhizin, saccharin and cyclamates may also be included with the base materials.

Binders that are commonly used are natural gums and hydrocolloids such as gum arabic, guar gum, agar, alginates, gum tragacanth, gelatin, corn syrup, starches and maltodextrins. Most commonly used binders are gelatin, gum arabic and maltodextrins or corn syrups. When non-sugar polyols such as sorbitol are used as the base material, binders are not needed for binding since many of these polyols are easily compressed to form tablets. In some cases polyols such as sorbitol may also act as a binder and may be combined with sugar to form the base materials for the compressed tablet. Binders usually comprise about 2% to about 8% of the tablet.

Lubricants are used to give good release from the press tooling or die and punches. A variety of lubricants or non-stick agents may be used in a tablet to act as release agents. Some of these are starch, acetylated monoglycerides, waxes, lecithins, emulsifiers, and mono-, di-, or tristearates. The most common of these lubricants are magnesium or calcium stearate and stearic acid. Solid lubricants are added to the tablet composition to help form the tablet and allow for its release from the tablet press. Lubricants usually comprise about 0.5% to about 2% of the tablet. In some instances, low levels of flow agents such as silicon dioxide are added to the tablet composition to help the flow of the mixture into the tablet press.

Flavoring agents are preferably added at a level of about 0.01% to about 2% by weight of the tablet. The flavoring agents may comprise essential oils, synthetic flavors, or mixtures including but not limited to oils derived from plants and fruits such as citrus oils, fruit essences, peppermint oil, spearmint oil, clove oil, oil of wintergreen, anise and the like. Artificial flavoring components are also contemplated for use in tablets of the present invention. Those skilled in the art will recognize that natural and artificial flavoring agents may be combined in any sensorially acceptable blend. All such flavors and flavor blends are contemplated by the present invention.

In addition, menthol and physiological cooling agents (sometimes referred to as high-intensity coolants) may be added to the tablet at a level of about 0.01% to about 1%. Except for menthol, these cooling agents are preferably preblended with the flavor before being added to the mixture of ingredients used to form the tablet. Menthol may be preblended with the flavor or may be added to the tablet composition mixture in its crystalline form. Typical cooling agents include substituted p-menthane carboxamides, acyclic carboxamides, menthone glycerol ketals, menthyl lactate, menthyl succinate, and 3-1-menthoxypropane-1,2 diol. These cooling agents and flavors are also preferably used in the various coatings of the tablets.

Colors and other additives are also contemplated for use in the tablets and the coatings of this invention.

In some cases, ingredients used for tableting are wet granulated before blending with the flavor and lubricant. Most commonly, however, direct compressible material can be obtained for making the compressed tablet. The base materials are dry blended along with any high-intensity sweeteners before any flavor is added. Liquid flavors and solid flavors are added slowly to the base materials and mixed in a dry material mixer, such as a ribbon mixer or a Hobart mixer. Lastly, the lubricant such as magnesium stearate is added, but not overmixed. Overmixing the mixture with magnesium stearate can reduce lubrication. In general, the final powder mixture is allowed to sit for up to 12 hours before being sent to the tablet press so that its properties will be suitable for tableting, including drying if the mixture is too damp.

Conventional rotary tablet presses are used to produce the preferred tablet. Tablet presses may be obtained from Fette America, 300 Roundhill Dr., Rockaway, N.J.; Stokes Div. of DT Industries, 1500 Grundy's Lane, Bristol, Pa.; or Thomas Engineering, Inc. 575 W. Central Rd., Hoffman Estates, Ill. The basic steps of rotary tablet press operation involve four steps. The first step is to fill the die cavity; the second step is to adjust the fill by removing excess fill; the third step is compression; and the fourth step is ejection of the tablet from the die. In standard production equipment, there is also a precompression step before the final compression and then ejection. Preferred confectionery tablets are about 0.2 to about 0.5 grams in size.

The center tablet 20 is preferably coated with a 60% solution of an 80/20 mixture of sugar/gum arabic to form the binder layer 22. One or two coats of syrup are applied to the tablets in a conventional coating pan and dried with a 80/20 dry sugar/gum arabic mixture. If a sugarless product is desired, sorbitol may be substituted for the sugar in both the solution and powder. This binder layer 22 seals the center tablet 20 to prevent migration of components between the center and the coating layers, and aids in the adherence of the compound coating layer 24.

A compound coating consisting of sugar; fat; a milk powder such as whole milk powder, non-fat milk powder or whey powder; and lecithin is applied as a coating to form the compound coating layer 24. Preferable compound coatings may be obtained from any number of chocolate suppliers as a "white" compound coating. Compound coatings are generally described in Chapter 6 of Chocolate, Cocoa, and Confectionery: Science and Technology by B. W. Minifie, $3^{rd}$ Edition, incorporated herein by reference. The compound coating material is obtained in solid form and melted at about 100° F. and mixed with a flavor, and, in the most preferred embodiment of the invention, cooling agents and high-intensity sweeteners, and applied in about 20–40 coating applications until the piece is increased in size by about 50–100%. As each coat is applied to the room temperature tablets, the compound coating solidifies to form a soft coating over the tablet. After each application cool air may be used to accelerate the solidification of the coating. The preferred thickness of the compound coating layer will comprises about 20% to about 50% of the final product weight.

In some instances, a solid fat may be used in place of a compound coating. Suitable solid fats include triglycerides of various fatty acids, such as lauric acid, myristic acid, palmitic acid, or stearic acid. The longer the fatty acids chain length, the higher the melting point of the fat. Usually hydrogenated fats are needed since unsaturated fats have lower melting points and therefore would not give a soft-shell. Lauric acid fats are shorter in chain length and are derived from coconut and palm kernels. Non-lauric fats are longer chain fatty acids and may be derived from cocoa butter, palm oil, soybean oil and cottonseed oil. In general a suitable fat may be a combination of various fatty acid triglycerides, but should have a melting point of about 90° F. to about 140° F. Preferably, a suitable fat with a melting point of about 100° F. to about 110° F. should be used to give a suitable soft coating. Flavors and cooling agents may be added to the soft fat coating, which can be applied in a manner similar to the above described preferred compound coating. In addition, high-intensity sweeteners may be added to the soft fat coating, as well as small amounts of sugar or polyols to increase the firmness of the soft fat coating.

The soft-coated product is then coated with a second binder layer 26. This layer is preferably made from solution of an 80/20 mixture of sugar and gum arabic in a 60% solution and dried with powder 80/20 mixture of sugar and gum arabic. As with the first binding layer 22, the second binder layer 26 prevents migration of materials between the layers and allows the next layer to bind to the compound coating, and may be made with sorbitol instead of sugar for a sugarless product.

Next the hard shell layer 28 is applied. This layer may be a conventional hard shell sugar coating. In the preferred method of the present invention, a 70% sugar solution is made with added modified starch to act as a binder, along with flavors, coolants, and high-intensity sweeteners, and used to coat the soft coated tablet. Early applications of the sugar coating are preferably done at room temperature to reduce melting of the soft coating, but warmer solutions may be used after the initial coats. After each coating, warm air is applied to dry the sugar coating. Applications are continued until about a 33% increase in the size of the tablet is obtained. Coated tablets are then removed from the pan coater and allowed to dry overnight. If a sugarless product is desired, a hard shell coating can preferably be made from various polyols, such as sorbitol, xylitol and maltitol. The hard shell layer will generally comprise between about 20% and about 50% of the total product weight.

Finally, several applications of a film coating are applied to the sugar coated tablets to build up a film coating layer 30. The preferred film coating is made from an aqueous mixture of hydroxypropyl starch, sodium alginate, and microcrystalline cellulose, along with mint flavors and film softeners, such as glycerin. Other types of celluloses, starches, maltodextrins, gums and film forming agents may also be used to form the final coating. Optionally, high-intensity coolants may be added to the flavor, and high-intensity sweeteners or sugar or polyols may also be added to the mixture used for film coating.

The preferred embodiment of the invention is thus a coated product comprising: a) a compressed tablet center containing about 0.3% to about 2% flavors, including high-intensity coolants, b) a first coating comprising a fat or compound coating that includes about 0.5% to about 3% flavor, also including high-intensity coolants, c) a second coating of a hard shell comprising sugar or polyols and about 0.5% to about 3% flavor, also including high-intensity coolants, and d) a third coating comprising a film containing film forming agents and about 10% to about 50% flavor, with e) binder layers on both the inside and outside of the first coating. The advantage of this product is that it provides a mild, cool, mint flavor initially when placed in the mouth and gradually gives a stronger and more intense flavor with cooling as the product is chewed or sucked.

EXAMPLES

Mint Tablets

The following tablet center compositions in percentages were made:

Similar type sugarless tablet centers can be made according to the following formulas:

|  | Example 7 | Example 8 | Example 9 |
|---|---|---|---|
| Sorbitol | 97.08 | — | 96.89 |
| Xylitol | — | 97.78 | — |
| Magnesium stearate | 1.01 | 0.50 | 1.01 |
| Silicon Dioxide | — | — | 0.19 |
| Acesulfame K | 0.39 | 0.39 | 0.39 |
| Aspartame | 0.19 | — | 0.19 |
| Peppermint Flavor | 0.76 | 0.76 | 0.76 |
| Menthol | 0.26 | 0.26 | 0.26 |
| Coolant | 0.31 | 0.31 | 0.31 |
| Total | 100.0 | 100.0 | 100.0 |
| Tablet weight | 0.25 grams | 0.25 grams | 0.25 grams |

Soft Coating

For Example 1–6, the tablets were then coated with a sugar/gum arabic solution at a ratio of 80/20 and at a solids level of 60%. The 80/20 powdered sugar/gum arabic was then used to dry charge the wet tablets and dry the sugar/gum arabic coating. This is used as a seal coat between the tablet layer and compound coating layer, and to act as an adhesive for the compound coating.

The above tablets for Examples 1 and 2 were then coated with a compound coating comprising sugar, vegetable oil, non-fat milk solids, lecithin, titanium dioxide, and vanilla. This material was obtained from Blommer Chocolate Co. as "Kreamy White Coating." A different compound coating, using whey powder instead of non-fat milk solids, was used to coat the tablets of Examples 3–6. In each case, the compound coating was melted and the flavors, coolants, and high-intensity sweeteners were added to the coating mixture according to the following compositions:

|  | Example 1 | Example 2 | Example 3 | Example 4 | Example 5 | Example 6 |
|---|---|---|---|---|---|---|
| Sorbitol | 97.08 | 48.99 | 48.75 | 48.95 | 48.70 | 48.86 |
| Sugar | — | 48.99 | 48.75 | 48.95 | 48.70 | 48.86 |
| Magnesium stearate | 1.01 | 0.75 | 0.50 | 0.50 | 0.50 | 0.50 |
| Silicon Dioxide | — | — | 0.25 | 0.18 | 0.25 | 0.24 |
| Acesulfame K | 0.39 | — | — | — | — | — |
| Aspartame | 0.19 | — | — | — | — | — |
| SD Flavor* | — | — | — | — | 0.27 | — |
| Flavor** | 0.76 | 0.72 | 0.90 | 0.55 | 0.63 | 1.25 |
| Menthol | 0.26 | 0.25 | 0.15 | 0.15 | 0.20 | — |
| Coolant | 0.31 | 0.30 | 0.70 | 0.72 | 0.75 | 0.29 |
| Total | 100.0 | 100.0 | 100.0 | 100.0 | 100.0 | 00.0 |
| Tablet weight | 0.35 grams | 0.35 grams | 0.25 grams | 0.25 grams | 0.25 grams | 0.25 grams |

*Spray dried cinnamon flavor is used in Example 5.
**Peppermint flavor is used in Examples 1–4 and 6, and cinnamon flavor is used in Example 5.

|  | Example 1 | Example 2 | Example 3 | Example 4 | Example 5 | Example 6 |
|---|---|---|---|---|---|---|
| Compound coating* | 96.09 | 98.00 | 98.03 | 96.60 | 98.23 | 98.62 |
| Flavor** | 2.39 | 1.20 | 1.18 | 2.60 | 1.18 | 1.00 |
| Menthol | 0.16 | 0.20 | 0.10 | 0.15 | — | — |
| Coolant | 0.86 | 0.60 | 0.69 | 0.65 | 0.59 | 0.38 |
| Acesulfame K | 0.25 | — | — | — | — | — |
| Aspartame | 0.25 | — | — | — | — | — |
| Total | 100.0 | 100.0 | 100.0 | 100.0 | 100.0 | 100.0 |
| Piece weight | 0.70 grams | 0.70 grams | 0.40 grams | 0.40 grams | 0.40 grams | 0.45 grams |

*Non-fat milk powder is used in Examples 1 and 2; whey powder is used in Examples 3–6.
**Peppermint flavor is used in Examples 1–4 and 6; cinnamon is used in Example 5.

For Examples 7–9, the tablets can be coated with the sorbitol/gum arabic solution at a ratio of 80/20 at a solids level of 60%. The 80/20 powdered sorbitol/gum arabic would then be used to dry charge the wet tablets and dry the coating to give a seal coat between the tablet layer and the next coating layer. These tablets can then be coated with a solid fat having a melting point of 110° F. (Ex. 7) or a compound coating made with xylitol (Ex. 8) or sorbitol (Ex. 9) in place of the sugar used to make typical compound coatings. Sweeteners and flavors can be added, resulting in the following formulas for the first coating layer in a sugarless product:

|  | Example 7 | Example 8 | Example 9 |
|---|---|---|---|
| Compound Coating | — | 96.09 | 96.09 |
| Fat | 96.09 | — | — |
| Peppermint Flavor | 2.39 | 2.39 | 2.39 |
| Menthol | 0.16 | 0.16 | 0.16 |
| Coolant | 0.86 | 0.86 | 0.86 |
| Acesulfame K | 0.25 | 0.25 | 0.25 |
| Aspartame | 0.25 | 0.25 | 0.25 |
| Total | 100.0 | 100.0 | 100.0 |
| Piece weight | 0.40 grams | 0.40 grams | 0.40 grams |

This gives a tablet with a soft coating that contains mint flavors and coolants. Again, the soft-coated tablets were then coated with the sugar/gum arabic solution at a ratio of 80/20 at a solids level of 60%. The 80/20 powdered sugar/gum arabic was again used to dry charge the wet tablets and dry the sugar/gum arabic coating. This is used as a seal coat between the compound coating layer and the next sugar-coating layer. For Examples 7–9, a sorbitol/gum arabic mixture is used between the soft coating and the hard shell coating. Again this is used to seal the soft coating from the hard coating and act as an adhesive for the following coats.

Hard Shell Coating

For Examples 1–6, the soft coated tablets were then coated with a hard shell sugar coating comprising sugar, starch, flavors, coolants, and optionally high-intensity sweeteners. A modified starch solution was formed at 80° C., then sugar was dissolved to form the coating syrup, and sugar syrup containing color was added. In Example 7, a sorbitol solution with gum arabic may be used to give a hard shell coating, whereas xylitol with gum arabic can be used to give the hard shell coating in Example 8. Maltitol may be used to give a hard shell coating in Example 9. The coating solution is cooled and high-intensity sweeteners are added. Flavors blended with coolants are added in several applications after the coating syrup is applied and before it is dried. Compositions of the coating mixtures used to form the second (hard shell) coating are shown in the following tables:

|  | Example 1 | Example 2 | Example 3 | Example 4 | Example 5 | Example 6 |
|---|---|---|---|---|---|---|
| Sugar | 91.70 | 92.34 | 91.24 | 90.40 | 92.92 | 92.58 |
| Starch | 5.50 | 5.54 | 5.47 | 5.43 | 5.58 | 5.55 |
| Flavor* | 1.35 | 1.29 | 1.37 | 1.80 | 1.39 | 1.48 |
| Coolant | 0.85 | 0.83 | 0.11 | 0.11 | 0.11 | 0.39 |
| Sweeteners | 0.60 | — | — | — | — | — |
| Color syrup | — | — | 1.81 | 2.26 | — | — |
| Total | 100.0 | 100.0 | 100.0 | 100.0 | 100.0 | 100.0 |
| Piece weight | 0.95 grams | 0.95 grams | 0.60 grams | 0.60 grams | 0.60 grams | 0.65 grams |

|  | Example 7 | Example 8 | Example 9 |
|---|---|---|---|
| Sorbitol | 95.70 | — | — |
| Xylitol | — | 91.70 | — |
| Maltitol | — | — | 93.70 |
| Gum Arabic | 1.50 | 5.80 | 3.50 |
| Peppermint Flavor | 1.35 | 1.35 | 1.35 |
| Coolant | 0.85 | 0.85 | 0.85 |
| Intense Sweeteners | 0.60 | 0.30 | 0.60 |
| Total | 100.0 | 100.0 | 100.0 |
| Piece weight | 0.60 grams | 0.60 grams | 0.60 grams |

*Peppermint flavor is used in Examples 1–4 and 6; cinnamon flavor is used in Example 5.

Hard shell coated tablets are removed from the coating pans, spread on trays and allowed to cool and dry overnight. The examples are then coated with a film coating.

Film Coating

The film coatings are prepared by dry blending the film forming agents of hydroxypropyl (HP) starch, sodium alginate, and microcrystalline cellulose and mixing the blend into water at a ratio of about 7:1 water: film formers. The resulting mixture is heated to about 80° C. to dissolve and disperse the film formers. The solution is then cooled, and glycerin, flavor and optionally high-intensity sweeteners or some sugar may be added to form a thick suspension. The materials may be blended together and formed into a viscous suspension by high shear mixing. Two applications of the suspension is applied to the hard shell coated product, and dried to about 10% moisture after each application. The film coating applications add about 0.1% to about 1% to the weight of the product, but give it a smooth surface and a shine. The following compositions are used for the film coating of the examples:

|  | Example 1 | Example 2 | Example 3 | Example 4 | Example 5 | Example 6 |
| --- | --- | --- | --- | --- | --- | --- |
| Flavor* | 37.80 | 37.80 | 38.79 | 39.90 | 43.11 | 53.12 |
| Menthol | 4.20 | 4.20 | 4.31 | 4.43 | — | — |
| HP starch | 34.23 | 34.23 | 34.97 | 34.23 | 34.97 | 21.55 |
| Alginate | 15.00 | 15.00 | 20.59 | 15.00 | 15.32 | 9.44 |
| Glycerin | 5.11 | 5.11 | — | 5.11 | 5.27 | 3.25 |
| Acesulfame K | 1.55 | 1.55 | — | — | — | 11.81** |
| Aspartame | 0.78 | 0.78 | — | — | — | — |
| Cellulose | 1.33 | 1.33 | 1.34 | 1.33 | 1.33 | 0.83 |
| Total | 100.0 | 100.0 | 100.0 | 100.0 | 100.0 | 100.0 |

*Peppermint flavor is used in Examples 1–4 and 6, cinnamon flavor is used in Example 5.
**Sugar is used as a sweetener in place of high-intensity sweeteners in Example 6.

For Examples 7–9, any one of the film compositions shown above may be used to give a film coating on these examples.

Sensory evaluation of the products of Examples 1 through 6 indicates that the flavor and coolness of the product is very mild initially, but develops a stronger more intense flavor with cooling after a period of time. The flavor develops slowly whether the mint tablet is chewed or sucked.

Example 2–6 are further unique in having a compressed center tablet made from equal amounts of sorbital and sugar. This combination of materials work very well together to form a tablet. The film forming composition used in Examples 1–6 also provides especially preferred properties to the product. First, the film provides a layer that can quickly release a flavor, giving a quick initial flavor impact. Also, the flavor in this layer may give the product a desirable aroma for when a package containing the product is opened. The preferred film forming agents give an especially desirable film coating layer.

It should be appreciated that the method and products of the present invention are capable of being incorporated in the form of a variety of embodiments, only a few of which have been illustrated and described above. For example, fruit flavors may be used instead of the mint and cinnamon flavors in the examples. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes that comes within the meaning and range of equivalency of the claims are to be embraced within their scope.

What is claimed is:

1. A coated confectionary tablet product comprising:
    a) a compressed tablet center;
    b) a first coating layer surrounding the tablet center and comprising a fat;
    c) a second coating layer surrounding the first coating layer and comprising a hard shell made from one or more sugars and polyols; and
    d) a third coating layer surrounding the second coating layer and comprising a film containing film forming agents.

2. The coated confectionary tablet of claim 1 further comprising a binder layer between the compressed tablet and the first coating layer.

3. The coated confectionary tablet of claim 1 further comprising a binder layer between the first and second coating layers.

4. The coated confectionary tablet of claim 1 wherein the first coating layer comprises a soft compound coating.

5. The coated confectionary tablet of claim 1 wherein the compressed tablet comprises about 0.3% to about 2% flavor.

6. The coated confectionary tablet of claim 5 wherein the flavor in the compressed tablet includes one or more high-intensity coolants.

7. The coated confectionary tablet of claim 1 wherein the first coating comprises about 0.5% to about 3% flavor.

8. The coated confectionary tablet of claim 7 wherein the flavor in the first coating includes one or more high-intensity coolants.

9. The coated confectionary tablet of claim 1 wherein the second coating comprises about 0.5% to about 3% flavor.

10. The coated confectionary tablet of claim 9 wherein the flavor in the second coating includes one or more high-intensity coolants.

11. The coated confectionary tablet of claim 1 wherein the third coating layer comprises about 10% to about 50% flavor.

12. The coated confectionary tablet of claim 11 wherein the flavor in the third coating includes ones or more high-intensity coolants.

13. The coated confectionary tablet of claim 1 wherein the hard shell coating is made from a sugar selected from the group consisting of sucrose, dextrose, maltose and mixtures thereof.

14. The coated confectionary tablet of claim 1 wherein the hard shell coating is made from a polyol selected from the group consisting of sorbitol, maltitol, xylitol, hydrogenated isomaltalose, lactitol, eyrthritol and mixtures thereof.

15. A multilayer coated confectionary product comprising:
    a) a center;
    b) a first layer covering the center, the first layer comprising a compound coating;

c) a second layer covering the first layer, the second layer comprising a hard shell coating; and d) a third layer covering the second layer, the third layer comprising a film layer.

16. The multilayer confectionary product of claim 15 wherein the product is sugarless.

17. The multilayer confectionary product of claim 15 wherein the compound coating and hard shell coating both comprise a sugar.

18. The multilayer confectionary product of claim 15 further comprising a binder layer between either the first and second layers, between the second and third layers, or between both the first and second and between the second and third layers, the binder layer comprising a binder selected from the group consisting of gum arabic, modified starches, and mixtures thereof.

19. The multilayer coated confectionary product of claim 15 wherein the film layer comprises a film forming agent selected from the group consisting of celluloses, starches, maltodextrins, gums and mixtures thereof.

20. The multilayer coated confectionary product of claim 15 wherein the film layer comprises a film forming agent selected from the group consisting of hydroxypropyl starch, sodium alginate and microcrystalline cellulose and mixtures thereof.

21. The multilayer coated confectionary product of claim 15 wherein the first coating comprises about 20% to about 50% by weight of the product.

22. The multilayer coated confectionary product of claim 15 wherein the first coating comprises between about 50% and about 100% by weight of the center.

23. The multilayer coated confectionary product of claim 15 wherein the hard shell layer comprise about 20% to about 50% by weight of the product.

24. The multilayer coated confectionary product of claim 15 wherein the center comprises a compressed tablet.

25. The multilayer coated confectionary product of claim 15 wherein the center is between about 0.2 and about 0.5 grams in size.

26. The multilayer coated confectionary product of claim 24 wherein the compressed tablet comprises a base material, a binder, a flavor and a lubricant.

27. The multilayer coated confectionary product of claim 26 wherein the flavor comprises a high-intensity coolant selected from the group consisting of substituted p-menthane carboxamides, acyclic carboxamides, menthone glycerol ketals, menthyl lactate, menthyl succinate, 3-1-menthoxypropane-1,2 diol and mixtures thereof.

28. The multilayer coated confectionary product of claim 15 wherein the compound coating comprises a sugar, a fat, a milk powder and lecithin.

29. The multilayer coated confectionary product of claim 28 wherein the milk powder is selected from the group consisting of whole milk powder, non-fat milk powder, whey powder and mixtures thereof.

30. A confectionary product comprising:

a) a compressed tablet center comprising
 i) a sweetener selected from the group consisting of sucrose, sorbitol and mixtures thereof;
 ii) a lubricant; and
 iii) flavor, including menthol and a physiological cooling agent;

b) a first binder layer covering the tablet center comprising
 i) a sweetener selected from the group consisting of sugar, sorbitol and mixtures thereof and
 ii) a binder selected from the group consisting of gum arabic, modified starch and mixtures thereof;

c) a soft compound coating layer covering the first binder layer, the soft compound coating comprising
 i) a fat;
 ii) a milk powder;
 iii) a sweetener selected from the group consisting of sucrose, sorbitol and mixtures thereof;
 iv) lecithin; and
 v) flavor, including menthol and a physiological cooling agent;

d) a second binder layer covering the compound coating layer comprising
 i) a sweetener selected from the group consisting of sugar, sorbitol and mixtures thereof and
 ii) a binder selected from the group consisting of gum arabic, modified starch and mixtures thereof;

e) a hard shell coating covering the second binder layer, the hard shell coating comprising
 i) a sweetener selected from the group consisting of sucrose, sorbitol and mixture thereof;
 ii) modified starch; and
 iii) flavor, including a high-intensity coolant; and f) a film coating covering the hard shell layer, the film coating comprising
 i) a film forming agent selected from the group consisting of celluloses, starches, maltodextrins, gums and mixtures thereof; and
 ii) flavor, including menthol.

31. The multilayer confectionary of claim 30 wherein the center comprises between about 0.3% to about 2% flavor, the compound coating comprises between about 0.5% and about 3% flavor, the hard shell comprises between about 0.5% and about 3% flavor and the film layer comprises between about 10% and about 50% flavor.

32. A method of producing a multilayer confectionary product comprising the steps of:

a) providing a center b) forming a compound coating layer over the center by applying multiple coats of a molten compound coating over the center, with cooling between coats to solidify the compound coating;

c) applying a hard shell coating over the compound coating layer by panning the compound coated center by applying multiple coats of a panning syrup comprising a sugar, a polyol or mixtures thereof; and d) applying a film coating over the hard shell coating layer by applying multiple coats of a syrup containing one or more film forming agents.

33. The method of claim 32 wherein the center is provided by compressing a mixture of a sweetener, binder, lubricant and flavor into a compressed tablet.

34. A multilayer confectionary product that builds in flavor intensity as the product dissolves in the mouth comprising:

a) a film layer that provides a mild flavor impact;

b) a hard shell coating under the film layer and providing a higher flavor impact than the film layer;

c) a compound coating layer under the hard shell coating and providing a higher flavor impact than the hard shell coating; and d) a tablet center inside the compound coating layer.

35. The multilayer confectionary product of claim 34 wherein the center provides a higher flavor impact than the compound coating layer.

* * * * *